United States Patent
Yamamoto et al.

(12)

(10) Patent No.: US 6,376,633 B1
(45) Date of Patent: Apr. 23, 2002

(54) ACRYLIC PRESSURE-SENSITIVE ADHESIVE COMPOSITION AND PROCESS FOR PRODUCING THE SAME

(75) Inventors: Takayuki Yamamoto; Tomohiro Taruno; Tomohide Bamba; Mitsuhiro Kanada; Yoshihiro Minamizaki, all of Osaka (JP)

(73) Assignee: Nitto Denko Corporation, Osaka (JP)

( * ) Notice: Subject to any disclaimer, the term of this patent is extended or adjusted under 35 U.S.C. 154(b) by 0 days.

(21) Appl. No.: 09/472,870

(22) Filed: Dec. 28, 1999

(30) Foreign Application Priority Data

Dec. 28, 1998 (JP) ............................. 10-373294

(51) Int. Cl.$^7$ .............................................. C08F 120/18
(52) U.S. Cl. ...................... 526/329.7; 526/89; 526/236
(58) Field of Search ........................ 526/89, 236, 329.7

(56) References Cited

U.S. PATENT DOCUMENTS 5,824,726 A   10/1998   DeSimone et al. ......... 524/424

FOREIGN PATENT DOCUMENTS

EP   0 818 470 A1   1/1998

OTHER PUBLICATIONS

European Search Report.

*Primary Examiner*—Helen L. Pezzuto
(74) *Attorney, Agent, or Firm*—Sughrue Mion, PLLC

(57) ABSTRACT

An acrylic pressure-sensitive adhesive composition which contains a high molecular weight polymer, is excellent in cohesive force and adhesive strength and can be prepared without using an organic solvent.

The acrylic pressure-sensitive adhesive composition is produced by a process which comprises radical-polymerizing monomers containing an alkyl (meth)acrylate using carbon dioxide as a diluent to thereby prepare a pressure-sensitive adhesive composition containing an acrylic polymer having a weight average molecular weight of 400,000 or more. The polymerization pressure ranges from, for example, about 5.7 to 40 MPa, AND the polymerization temperature ranges from, for example, about 20 to 100° C.

4 Claims, No Drawings

ACRYLIC PRESSURE-SENSITIVE ADHESIVE COMPOSITION AND PROCESS FOR PRODUCING THE SAME

FIELD OF THE INVENTION

This invention relates to an acrylic pressure-sensitive adhesive composition which is useful as adhesives in adhesive tapes or sheets and a process for producing the same.

BACKGROUND OF THE INVENTION

Acrylic pressure-sensitive adhesive compositions have been industrially produced mostly by solution polymerization or emulsion polymerization. In these methods, polymerization is usually initiated by radical initiators under-heating or with radiation irradiation.

In the solution polymerization method, acrylic pressure-sensitive adhesive compositions are prepared by polymerizing an alkyl (meth)acrylate optionally together with modifier monomers (acrylic acid, styrene, vinyl acetate, etc.) in an organic solvent (toluene, etc.). In the solution polymerization using an organic solvent, the developed polymer chain undergoes chain transfer into the solvent, which generally makes it difficult to obtain a high-molecular weight polymer or to achieve a large cohesive force. Moreover, use of a large amount of an organic solvent is unfavorable from the viewpoints of resource saving and environmental health (i.e., protecting environment from air pollution).

In the emulsion polymerization method, on the other hand, acrylic pressure-sensitive adhesive compositions are prepared by polymerizing an alkyl (meth)acrylate optionally together with modifier monomers (acrylic acid, styrene, vinyl acetate, etc.) not in an organic solvent but in water which is employed as a medium with the use of an emulsifier, i.e., in a state having been emulsified in water. The acrylic pressure-sensitive adhesive compositions prepared by this method are advantageous from the viewpoints of resource saving and environmental health. In addition, these acrylic pressure-sensitive adhesive compositions obtained by this method have relatively high molecular weight and exhibit relatively large cohesive force as pressure-sensitive adhesives, compared with the polymers obtained by the solution polymerization method. However, the pressure-sensitive adhesive compositions obtained by this method suffer from some troubles such that they are poor in water resistance due to the emulsifiers contained therein and that the adhesive strength thereof is lowered since the emulsifiers are present on the surface thereof.

Accordingly, an object of the present invention is to provide an acrylic pressure-sensitive adhesive composition which contains a high-molecular weight polymer, is excellent in cohesive force and adhesive strength and can be prepared without using any organic solvent.

The present inventors have conducted intensive studies to achieve the above-described object. As a result, they have found out that an adhesive composition being excellent in cohesive force and adhesive strength can be obtained by radical-polymerizing monomer(s) containing an alkyl (meth)acrylate with the use of carbon dioxide as a diluent to thereby form a high-molecular weight polymer, thus completing the present invention.

SUMMARY OF THE INVENTION

Accordingly, the present invention provides a process for producing an acrylic pressure-sensitive adhesive composition, which comprises radical-polymerizing monomers containing an alkyl (meth)acrylate using carbon dioxide as a diluent to thereby prepare a pressure-sensitive adhesive composition containing an acrylic polymer having a weight-average molecular weight of 400,000 or more. The polymerization is performed, for example, under a pressure of 5.7 to 40 MPa at a temperature of 20 to 100° C.

The present invention further provides an acrylic pressure-sensitive adhesive composition which is obtained by polymerization using carbon dioxide as a diluent and contains, as the main component, an acrylic polymer containing an alkyl (meth)acrylate as a monomer unit and having a weight average molecular weight of 400,000 or more.

DETAILED DESCRIPTION OF THE INVENTION

The alkyl (meth)acrylate to be used as a monomer in the present invention includes alkyl acrylates and alkyl methacryaltes, each having 1 to 18 carbon atoms in the alkyl group. Example of the alkyl (meth)acrylate include methyl acrylate, ethyl acrylate, propyl acrylate, isopropyl acrylate, butyl acrylate, isobutyl acrylate, 2-ethylhexyl acrylate, octyl acrylate, nonyl acrylate, isononyl acrylate, decyl acrylate, dodecyl acrylate, butyl methacrylate, 2-ethylhexyl methacrylate and octyl methacrylate. Those alkyl (meth)acrylates can be used alone or as mixtures of two or more thereof.

Only the above-described alkyl (meth)acrylate may be used as the monomer, but it is possible to use the above-described alkyl (meth)acrylate as the main component together with other monomers copolymerizable therewith. Examples of the copolymerizable monomers include carboxyl-containing ethylenically unsaturated monomers such as (meth)acrylic acid, crotonic acid, itaconic acid, maleic acid and fumaric acid. Of those carboxyl-containing ethylenically unsaturated monomers, acrylic acid is particularly preferable. The carboxyl-containing ethylenically unsaturated monomers are an important component to form crosslinkages in the polymer. As other copolymerizable monomers, various monomers which are known in the art as modifier monomers used in acrylic pressure-sensitive adhesives can be used, for example, vinyl acetate, styrene, acrylonitrile, polar group-containing monomers other than the carboxyl-containing ethylenically unsaturated monomers as described above (hydroxyl-containing monomers, epoxy-containing monomers, amido-containing monomers, amino-containing monomers, etc.). By taking the adhesion characteristics into consideration, it is preferable that those copolymerizable monomers are used in an amount of 50% by weight or less based on weight of the total monomers containing the above-described alkyl (meth)acrylate.

The polymerization reaction can be carried out with the aid of a polymerization initiator capable of forming radicals upon decomposition, and the initiators which are generally used in radical polymerization can be used. For instance, when the polymerization is conducted at 40 to 100° C., dibenzoyl peroxide, tert-butyl permaleate, 2,2'-azobisisobutyronitrile, azobisisovaleronitrile, etc., are used as the polymerization initiator. When the polymerization is conducted at 20 to 40° C., a binary initiator (Redox initiator) such as a binary system composed of dibenzoyl peroxide and dimethylaniline is used.

The initiator is used in an amount usually used in polymerizing acrylic monomers, for example, about 0.005 to 10 parts by weight, preferably 0.1 to 5 parts by weight, per 100 parts by weight of the total monomers as described above.

The amount of carbon dioxide used in the present invention as a diluent is, for example, 5 to 2,000 parts by weight, preferably 20 to 900 parts by weight, per 100 parts by weight of the total monomers as described above. Although it is usually sufficient to use carbon dioxide alone as the diluent, the diluent may further contain a small amount of an organic solvent to improve the miscibility, etc., if necessary.

The polymerization is conducted in carbon dioxide under a pressure regulated to, for example, about 5.73 to 40 MPa in a temperature range of, for example, about 20 to 100° C. For example, the polymerization can be conducted in carbon dioxide in a supercritical state. The polymerization time is usually about 2 to 20 hours (for example, about 4 to 10 hours) The polymerization pressure and temperature may be varied stepwise, if necessary.

Since carbon dioxide is used as a diluent in the process of the present invention, chain transfer reaction of the polymer chain grown into the solvent does not occur. For this reason, relatively high molecular weight acrylic polymers as compared with those obtained by the solution polymerization, i.e., acrylic polymers having a weight-average molecular weight of 400,000 or more (for example, 400,000 to 2,000,000), are, obtained. Acrylic pressure-sensitive adhesives containing such polymers exhibit high cohesive force. The weight-average molecular weight can be regulated by controlling the type and content of monomers, the type and content of the polymerization initiator, the polymerization temperature, the polymerization time, etc.

Since it is not necessary in the present invention to use an emulsifier, the adhesive strength of the adhesive composition is not impaired. Further, the system is always maintained at low viscosity even during the polymerization due to the dilution effect established by the carbon dioxide used as the diluent, which contributes to the improvement in the stirring effect.

The pressure-sensitive adhesive composition thus prepared may be used as such, but various additives may be added thereto before using the composition, if necessary. For example, conventional tackifier resins (rosin-based resins, terpene-based resins, petroleum resins, coumarone-indene resins, styrene-based resins, etc.) may be blended with the composition in order to control the adhesive properties of the adhesive composition comprising the above-described acrylic polymer as the main adhesive component. Further, conventional various additives such as plasticizers, fillers (calcium carbonate, fine silica powder, etc.), coloring materials or ultraviolet absorbers can be blended as additives other than the tackifier resins. The amount of those additives may be an amount generally used in acrylic pressure-sensitive adhesives.

The pressure-sensitive adhesive composition of the present invention may further contain a crosslinking agent. The acrylic polymer is crosslinked by the crosslinking agent, thereby further enhancing the cohesive force as the adhesive.

The crosslinking agent widely includes various conventional materials. Of those, polyfunctional melamine compounds such as methylated trimethylolmelamine, and polyfunctional epoxy compounds such as diglycidylaniline or glycerol diglycidyl ether are particularly preferable. The polyfunctional melamine compounds and the polyfunctional epoxy compounds can be used in combination. The crosslinking agent is used in an amount of, for example, from 0.001 to 10 parts by weight, appropriately from 0.01 to 5 parts by weight, per 100 parts by weight of the acrylic polymer.

It is also preferable to use polyfunctional isocyanate compounds. Examples of such compounds include tolylene diisocyanate, hexamethylene diisocyanate, polymethylene polyphenyl isocyanate, diphenylmethane diisocyanate, diphenylmethane diisocyanate dimer, a reaction product obtained form trimethylolpropane and tolylene diisocyanate, a reaction product obtained from trimethylolpropane and hexamethylene diisocyanate, polyether polyisocyanate and polyester polyisocyanate. Such a compound is used in an amount of, for example, from 0.001 to 20 parts by weight, appropriately from 0.01 to 15 parts by weight, per 100 parts by weight of the acrylic polymer.

The pressure-sensitive adhesive composition according to the present invention may be formed into a film by, for example, discharging from the carbon dioxide-containing atmosphere under elevated pressure into the atmosphere through a port of, for example, a dice. Alternatively, the polymer once returned to the atmospheric pressure may be collected and then dissolved again in an organic solvent (toluene, etc.) followed by film-formation by a coating method using a conventional roll coater, etc. Furthermore, the pressure-sensitive adhesive composition of the present invention can be used in various forms, for example, adhesive tapes prepared by applying the pressure-sensitive adhesive composition onto one or both sides of various substrates (paper, non-woven fabric, plastic sheet, foamed sheet, etc.) to obtain an adhesive layer of a desired thickness, or substrate-free adhesive tapes prepared by applying the pressure-sensitive adhesive composition to a release paper to obtain an adhesive layer of a desired thickness.

In those application embodiments, the acrylic polymer which has been applied onto an adherend, a substrate, a release paper, etc., to form an adhesive layer may appropriately be subjected to a crosslinking treatment in the drying step after coating or in the subsequent light-exposure or electron beam-irradiation step.

As described above, carbon dioxide is used as the diluent in the present invention. Since this diluent volatilizes together with the release of the pressure after the polymerization, the drying step by, for example, an oven can be simplified, and this is also preferable in the points of resource saving and environmental health.

According to the present invention, carbon dioxide that is a solvent having no radical chain transfer is used as a diluent. Therefore, high molecular weight acrylic polymers are obtained as compared with polymers synthesized using an organic solvent. In addition, it is not necessary to use any emulsifiers, etc., which makes it possible to obtain an acrylic pressure-sensitive adhesive composition having excellent cohesive force and also excellent adhesive force.

Further, since carbon dioxide is used as the diluent in the polymerization and coating, the diluent can quickly be removed after completion of the polymerization and coating. In addition, the polymerization and coating can be carried out without using an organic solvent, and this is advantageous in the points of resource saving and environmental health.

The present invention will be described in greater detail by reference to the following examples, but it should be understood that the invention is not construed as being limited thereto. Unless otherwise indicated, all parts and percents are by weight.

Adhesive force and cohesive forth were measured by the following methods.

(Adhesive Force)

Each of the tape pieces produced in the examples and comparative examples was contact-adhered to a stainless steel plate which had been surface-finished with a #280 sandpaper, by one reciprocation of a 2 kg roller. The resulting assembly was allowed to stand for 30 minutes, and a dry 180° peel adhesive force (gf/10 mm width) of the tape to the stainless steel plate was measured under normal conditions. The peeling speed was 300 mm/min.
(Cohesive Force)

Each of the tape pieces produced in the examples and comparative examples was adhered to a Bakelite plate with a contact area of 20 mm×10 mm. The Bakelite plate was vertically arranged so that the tape piece was also hung extending downwardly from the adhered portion. A 500 g weight was hung on the free end of the tape piece at 40° C. The time until the tape was peeled from the adhered portion due to the load and weight fell down was measured. In the case of a sample that the weight did not fall down even after 120 minutes, the slippage distance (mm) of the tape on the adhered portion of the plate after 120 minutes was measured.

EXAMPLE 1

100 Parts of n-butyl acrylate, 5 parts of acrylic acid and 0 2 parts of 2,2'-azobisisobutyronitrile were blended so as to obtain 200 g of a mixture. The resulting mixture was introduced into a stainless high-pressure vessel (capacity: 500 ml) at 25° C., highly pure carbon dioxide was gradually poured thereinto while stirring with mixing blades, and the mixture was maintained under a pressure of 2 MPa. After several seconds, the carbon dioxide was discharged from an exhaust vent and the air remaining in the high-pressure vessel was replaced with carbon dioxide. After completion of the above procedure, highly pure carbon dioxide was introduced at 25° C. in the similar manner as above and the system was once maintained under a pressure of 7 MPa. Subsequently, the container was heated to rise the inner temperature to 65° C. When the temperature reached 65° C., highly pure carbon dioxide was once again introduced to regulate the inner pressure to 20 MPa. Polymerization was conducted while maintaining this state for about 6 hours, thereby obtaining a polymer solution containing an acrylic polymer. Weight average molecular weight of this polymer measured by a gel permeation chromatography method was 1,050,000.

The polymer solution thus obtained was discharged from a nozzle on one side of a polyester film having a thickness of 38 $\mu$m under atmospheric pressure and pressed at 100° C. for several seconds such that its thickness was 50 $\mu$m. Thus, an adhesive tape test sample was prepared without using any organic solvent, and this was used as a tape piece having the pressure-sensitive adhesive composition of Example 1 applied thereon.

Comparative Example 1

Into a three-necked flask type reactor (capacity: 500 ml) equipped with a thermometer, a stirrer, a nitrogen inlet tube and a reflux condenser 100 parts of n-butyl acrylate, 5 parts of acrylic acid, 0.2 parts of 2,2'-azobisisobutyronitrile and 200 parts of toluene were supplied so as to obtain 200 g of a mixture. The resulting mixture was stirred while introducing nitrogen gas for 1 hour to thereby replace the air in the reactor with nitrogen. The container was heated such that the inner temperature reached 65° C., and polymerization was conducted while maintaining, the mixture in this state for about 6 hours to obtain a polymer solution containing an acrylic polymer. Weight average molecular weight of this polymer measured by a gel permeation chromatography method was 270,000.

The polymer solution thus obtained was applied on one side of a polyester film having a thickness of 38 $\mu$m at a dry thickness of 50 $\mu$m and then dried at 100° C. for 10 minutes. Thus, an adhesive tape test sample was prepared and this was used as a tape piece having the pressure-sensitive adhesive composition of Comparative Example 1 applied thereon.

EXAMPLE 2

A polymer solution obtained in the same manner as in Example 1 was released into the atmosphere to collect an acrylic polymer. 100 Parts of the acrylic polymer thus collected were dissolved in 400 parts of ethyl acetate, and 0.02 part of a polyfunctional epoxy compound (TETRAD-C manufactured by Mitsubishi Gas Chemical Co., Inc.) was added thereto as a crosslinking agent. The solution obtained was applied on one side of a polyester film having a thickness of 38 $\mu$m at a dry thickness of 50 $\mu$m and then dried at 100° C. for 10 minutes. Thus, an adhesive tape test sample was prepared, and this was used as a tape piece having the pressure-sensitive adhesive composition of Example 2 applied thereon.

Comparative Example 2

To a polymer solution obtained in the same manner as in Comparative Example 1 was added 0.02 part, per 100 parts of the polymer, of a polyfunctional epoxy compound (TETRAD-C, manufactured by Mitsubishi Gas Chemical Co., Inc.) as a crosslinking agent. The solution obtained was applied on one side of a polyester film having a thickness of 38 $\mu$m in thickness at a dry thickness of 50 $\mu$m and then dried at 100° C. for 10 minutes. Thus, an adhesive tape test sample was prepared, and this was used as a tape piece having the pressure-sensitive adhesive composition of Comparative Example 2 applied thereon.

Comparative Example 3

Into a three-necked flask type reactor (capacity: 500 ml) equipped with a thermometer, a stirrer, a nitrogen inlet tube and a reflux condenser, 30 parts of distilled water containing 0.5 parts of potassium persulfate dissolved therein was introduced. After heating the resulting mixture to 80° C. in a nitrogen gas stream, a monomer mixture of 95 parts of n-butyl acrylate, 5 parts of acrylic acid, 0.25 part of ammonium polyoxyethylene alkyl ether sulfonate and 25 parts of distilled water was added dropwise the mixture over about 5 hours to conduct polymerization reaction, thereby obtaining an aqueous dispersion type pressure-sensitive adhesive composition having a solid content concentration of 64% and a gel fraction of 33.7%. Weight average molecular weight of a sol component of this polymer measured by a gel permeation chromatography method was 550,000.

To the aqueous dispersion type pressure-sensitive adhesive composition thus obtained was added 0.2 part, per 100 parts of the polymer, of a polyfunctional epoxy compound (TEPIC, manufactured by Nissan Chemical Industries, Ltd.) as a crosslinking agent. The resulting mixed solution was applied on one side of a polyester film having a thickness of 38 $\mu$m at a dry thickness of 50 $\mu$m and then dried at 100° C. for 10 minutes. Thus, an adhesive tape test sample was prepared, and this was used as a tape piece having the pressure-sensitive adhesive composition of Comparative Example 3 applied thereon.

Each of the adhesive compositions of Example 1 and 2 and Comparative Examples 1 to 3 was examined for adhesive force and cohesive force. The results obtained are shown in the Table below.

TABLE 1

| | Cohesive force | Adhesive strength (gf/10 mm) |
|---|---|---|
| Example 1 | 18 min (fell down) | 630 |
| Comparative Example 1 | 2 min (fell down) | 680 |
| Example 2 | 0.5 mm (slippage) | 670 |
| Comparative Example 2 | 69 min (fell down) | 610 |
| Comparative Example 3 | 22 min (fell down) | Cohesive failure |

As is apparent from the results shown in the Table, the acrylic pressure-sensitive adhesive compositions of the examples have each excellent cohesive force and also high adhesive force. Further, in the examples, carbon dioxide used as a diluent can very easily be removed and polymerization can be conducted without using an organic solvent. This contributes to the resource saving and the improvement in working environment.

What is claimed is:

1. A process for producing an acrylic polymer useful in an acrylic pressure-sensitive adhesive composition, which comprises radical-polymerizing at least one monomer containing an alkyl(meth)acrylate in the presence of carbon dioxide as a diluent to form an acrylic polymer having a weight average molecular weight of 400,000 or more, and crosslinking the acrylic polymer.

2. The process for producing an acrylic pressure-sensitive adhesive composition as claimed in claim 1, wherein said radical polymerization is conducted under a pressure of 5.7 to 40 MPa at a temperature of 20 to 100° C.

3. An acrylic pressure-sensitive adhesive composition comprising a crosslinked acrylic polymer having a weight average molecular weight of 400,000 or more, said polymer having been obtained by the process as claimed in claim 1.

4. The process for producing an acrylic pressure-sensitive adhesive composition as claimed in claim 1, wherein said crosslinking comprises reacting the polymer with a crosslinking agent.

* * * * *